United States Patent

[11] 3,549,160

[72] Inventor Elmer F. Etzkorn
 Park Ridge, Ill.
[21] Appl. No. 781,096
[22] Filed Dec. 4, 1968
[45] Patented Dec. 22, 1970
[73] Assignee Skil Corporation
 Chicago, Ill.
 a corporation of Delaware

[54] SOCKET RETENTION ASSEMBLY
 8 Claims, 8 Drawing Figs.
[52] U.S. Cl. .................................................. 279/97,
 287/53
[51] Int. Cl. ...................................................... B25g 3/26
[50] Field of Search........................................... 279/1(C),
 97, 76, 86; 287/53(TK), 119; 64/17

[56] References Cited
 UNITED STATES PATENTS
3,301,581 1/1967 Winberg...................... 287/119

3,326,323 6/1967 Delker.......................... 64/17X

Primary Examiner—Lester M. Swingle
Assistant Examiner—Donald D. Evenson
Attorney—McDougall, Hersh & Scott ABSTRACT: A socket retention assembly for releasably and coaxially connecting a socket member to a spindle member of a power tool by means of a retainer pin received in aligned transversely extending bores in the members, wherein movement of the retainer pin into the bores is limited by a head portion formed at one end of the shank portion of the pin and the center of gravity of the pin, when the pin is received in the bores, is offset from the axis of rotation of the members in a direction away from the head portion so that at high rotational speeds the pin will be held in the bores by the centrifugal force.

PATENTED DEC22 1970
3,549,160
INVENTOR
ELMER F. ETZKORN
BY Greist, Lockwood, Greenawalt & Dewey
ATT'YS
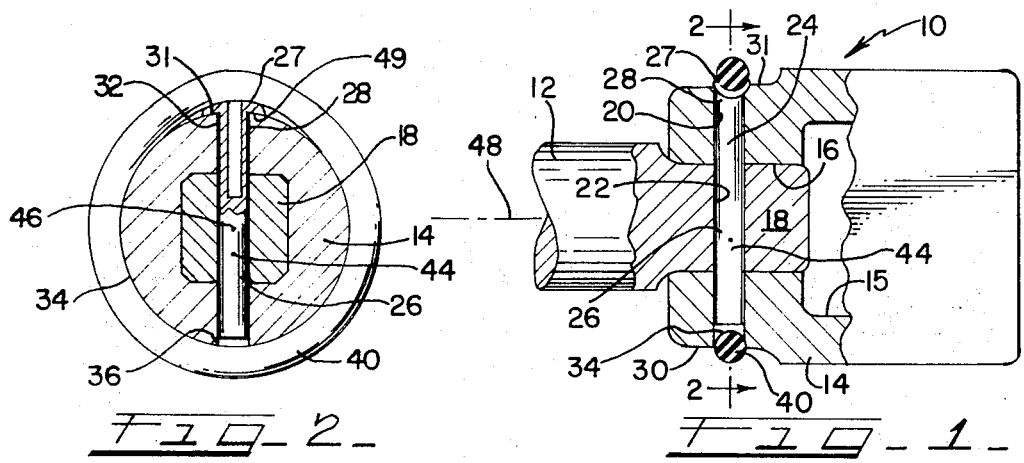
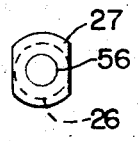
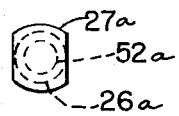
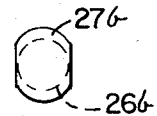
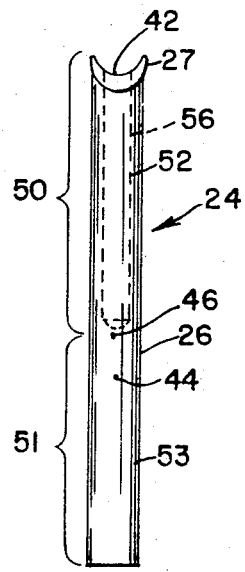
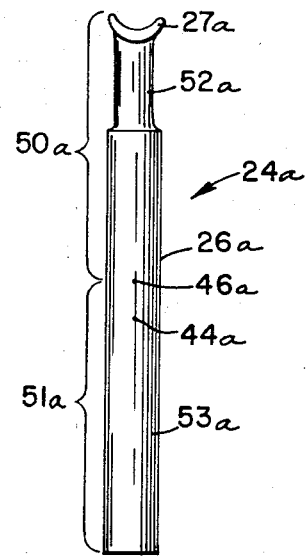
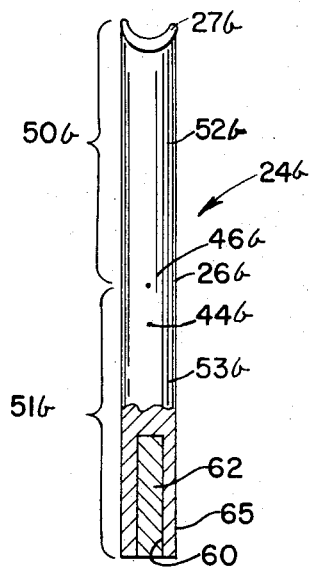

SOCKET RETENTION ASSEMBLY

BACKGROUND OF THE INVENTION

1. Field of the Invention

The field of this invention is that of a socket retention assembly for releasably and coaxially holding a socket member and a spindle member in driving engagement with one another. More specifically, the field is that of a socket retention assembly for use with a power tool having a spindle member which is rotated at a relatively high speed and a socket member which is releasably and coaxially connected to the spindle member.

2. Description of the Prior Art

Socket retention assemblies utilizing a retainer pin received in two transversely extending bores of two axially aligned members are well known in the prior art. In most of the prior art socket retention assemblies, one of the members has an axial opening therein and the other member has a shaft portion received in the axial opening of the one member. Typically, the axial opening of the one member and the shaft portion of the other member are of mating polygonal configuration whereby rotation of the one member will transmit rotational force to the other member. The transversely extending bore of the one member is in the region of the axial opening and the transversely extending bore of the other member is in the region of the shaft portion. The retainer pin is received in the aligned bores to prevent axial separation of the members.

To prevent escape of the retainer pin from the transversely extending bores, a ring or sleeve of resilient material is placed around the circumference of the one member in the area of the outer ends of the transversely extending bores in the one member to close off the outer ends of the bore and thereby maintain the retainer pin in the bores. Typically, the power tool is a rotary impact or rotary hammer-type tool wherein the polygonal configuration of the axial opening and shaft portion is square to provide a square drive.

At low speeds the socket retention assembly described above has proved satisfactory. However, when the rotational speed is too high, for example, above 5,700 r.p.m. a centrifugal force is developed on the retainer pin which causes the pin to move outwardly from the transversely extending bores and to overcome the resistance of the resilient ring or sleeve holding the retainer pin in the bores. This phenomena is caused by the fact that the center of gravity of the retainer pin is not coincident with the axis of rotation of the spindle member and the socket member. Furthermore, it is impossible to maintain the axial center of gravity of the retainer pin coincident with the axis of rotation of the members due to manufacturing tolerances of corresponding parts and due to the fact that, in most instances, the same pin is used in a number of different diameter sockets.

As a result of the centrifugal force developed on the pin, the pin eventually escaped from the bores. It will be appreciated that a retainer pin escaping from the members rotating at high speeds can be quite dangerous. Furthermore, after the pin escapes, the socket member can work its way axially out of engagement with the spindle member and this is also quite dangerous. Moreover, this problem, of the retainer pin working itself out of the transversely extending bores, is quite serious where the power tool is an air impact wrench which can develop an unloaded or free rotational speed up to approximately 11,000 r.p.m.

SUMMARY OF THE INVENTION

To prevent escape of the retainer pin from the aligned, transversely extending bores in a socket member and a spindle member, this invention provides a retainer pin having a shank portion and a head portion connected to one end of the shank portion, the head portion being adapted to engage the outer periphery of one of the members in the area adjacent one end of the transversely extending bore in the one member, to limit insertion of the pin into the bores, and the center of gravity of the retainer pin is offset from the axis of rotation of the members in a direction away from the head portion.

With the center of gravity of the retainer pin offset from the axis of rotation in a direction away from the head portion of the pin, the centrifugal force developed on the pin will bias the head portion against the outer periphery of the one member in the area adjacent the outer end of the bore in the one member. As a result the retainer pin will be maintained in the transversely extending bores and will not escape from the bores even at high rotational speeds.

In one embodiment of the invention, material is removed from that half of the retainer pin which includes the head portion. This can be done in a number of ways. One way is by forming an axial bore or opening in the retainer pin through the head portion and part of the shank portion. Another way is by relieving part of the shank portion beneath the head portion whereby that part of the shank portion between the geometric center of the pin and the head portion has a smaller cross section than the remainder of the shank portion.

In another embodiment of the invention the center of gravity is displaced in a direction away from the head portion by making that half of the shank portion not connected to the head portion heavier than the remainder of the retainer pin. Typically, this can be done by forming an opening in the end of the shank portion not connected to the head portion, and securing in the opening a weighted insert member having a greater density than the remainder of the retainer pin.

One object of the invention is to provide an improved socket retention assembly for holding a socket member connected to a spindle member.

Another object of the invention is to provide an improved socket retention assembly for holding a socket member connected to a spindle member of a power tool, while the members are rotating at a high speed, utilizing the centrifugal force generated by the speed of rotation.

Other objects and advantages of the invention will become more apparent from the following description taken in conjunction with the accompanying drawings.

BRIEF DESCRIPTION OF THE DRAWINGS

FIG. 1 is a side elevational view of a preferred embodiment of the socket retention assembly of this invention with portions broken away;

FIG. 2 is a sectional view taken along lines 2-2 of FIG. 1;

FIG. 3 is an enlarged side-elevational view of the retainer pin shown in FIG. 2;

FIG. 4 is a top plan view of the retainer pin shown in FIG. 3;

FIG. 5 is a side-elevational view of a modified form of retainer pin similar to the retainer pin shown in FIG. 3;

FIG. 6 is a top plan view of the retainer pin shown in FIG. 5;

FIG. 7 is a side elevational view, with portions broken away, of still another modified form of retainer pin similar to the retainer pin shown in FIG. 3; and FIG. 8 is a top plan view of the retainer pin shown in FIG. 7.

DESCRIPTION OF THE PREFERRED EMBODIMENTS OF THE INVENTION

The socket retention assembly of this invention is generally indicated at 10 in FIG. 1. The assembly 10 includes a spindle member 12 of a power tool (not shown, but which may be a hand-held pneumatically operated impact wrench, for example) and a socket member 14. In the illustrated embodiment, the socket member 14 has a socket 15 at one end and an axial opening 16 at the other end for receiving a shaft portion 18 of the spindle member. Preferably, the axial opening 16 and the shaft portion 18 are of mating polygonal cross section. In one preferred embodiment of the invention shown in FIG. 2, the axial opening 16 and the shaft portion 18 are square to provide a square drive between the spindle member 12 and the socket member 14.

Although the socket member 14 is shown in FIGS. 1 and 2 as having the axial opening 16, and the spindle member 12 is shown as having the shaft portion 18, it is to be understood that this relationship can be reversed. In other words, in a different embodiment of the invention, the spindle member can be formed with an axial opening therein for receiving a shaft portion extending from one end of the socket member.

The socket member 14 has a first transversely extending bore 20 which opens into the axial opening 16. The shaft portion 18 has a second transversely extending bore 22 which is adapted to be aligned with the first bore 20 in the socket member 14. After the shaft portion 18 is received in the axial opening 16, and the bores 20 and 22 are aligned, a retainer pin 24 is inserted in the first and second transversely extending bores 20 and 22 to hold the members 12 and 14 in driving engagement with each other.

The retainer pin 24 includes a shank portion 26 and a head portion 27 connected to one end 28 of the shank portion 26. After the retainer pin is inserted into the transversely extending bores 20 and 22, the head portion 27 engages the outer annular periphery 30 of the socket member 14 in the area 31 adjacent one outer end 32 of the first transversely extending bore 20 to limit insertion of the retainer pin 24 into the bores 20 and 22. In the embodiment illustrated in FIGS. 1 and 2, the socket member 14 has an annular groove 34 extending around the annular periphery 20 of the socket member 14 and over the outer ends 32 and 36 of the first transversely extending bore 20 with the outer ends 32 and 36 opening into the annular groove 26 as shown in FIG. 2. With this construction the head portion 27 actually engages the bottom of the annular groove 34 in the area 31 adjacent the one end 32 of the transversely extending bore 20.

In one preferred embodiment shown in FIGS. 1 and 2, a resilient O-ring 40, made of rubber or like material, is received in the annular groove 34 to hold the retainer pin 24 within the transversely extending bores 20 and 22. To facilitate positioning of the O-ring over the head portion 27, of the retainer pin, and also to help maintain the O-ring over the head portion 27, a slot 42 (FIG. 3) is formed in the head portion 27. When the retainer pin 24 is received in the bores 20 and 22, the slot 42 will mate or align with the annular groove 34. The resilient O-ring 40 is then placed or positioned in the annular groove 34 and the slot 42 to firmly hold the retainer pin in the bores 20 and 22.

To prevent escape of the retainer pin from the transversely extending bores 20 and 22 when the socket member 14 and the spindle member 12 are rotating at relatively high speeds, the axial center of gravity 44 of the retainer pin 24 is offset from the geometric center 46 of the shank portion 26 of the retainer pin in a direction away from the head portion a sufficient distance to offset the center of gravity 44 from the axis of rotation 48 of the spindle member 12 and the socket member 14 when the retainer pin 24 is positioned in the bores 20 and 22. In other words, the retainer pin 24 is dynamically unbalanced, so that, when the retainer pin 24 is received in the bores 20 and 22, the axial center of gravity of the retainer pin 24 is located at a distance from the underside 49 of the head portion 27 which is greater than half of the diameter of the bottom of the annular groove 34. At high rotational speeds, this unbalance of the retainer pin 24 causes the head portion 27 of the retainer pin 24 to be urged inwardly, against the bottom of the annular groove 34, due to centrifugal force developed on the retainer pin 24.

Referring to FIG. 3, the geometric center 46 of the shank portion divides the retainer pin in two sections 50 and 51. The first section 50 includes the head portion 27 and a part 52 of the shank portion 26; and the second section 51 includes the remainder 53 of the shank portion 26.

Various means can be employed to unbalance the retainer pin 24. For example, material can be removed from the first section 50 of the retainer pin 24 or weight can be added to the second section 51 of the retainer pin 24 to properly locate the axial center of gravity away from the axis of rotation 48 of the members 12 and 14 in a direction away from the head portion 27 when the pin 24 is received in the bores 20 and 22.

In FIGS. 2, 3 and 4, one form of retainer pin 24 is shown which has an opening 56 (preferably an axial bore) extending through the head portion 27 and into the one end 28 of the shank portion 26. The opening 56 does not extend farther than the geometric center 46 of the shank portion 26 so that the mass of the second section 51 is greater than the mass of the first section 50, whereby the center of gravity 44 of the retainer pin is spaced away from the geometric center 46 of the shank portion 26 in a direction away from the head portion 27.

In FIGS. 5 and 6, another form of retainer pin 24a is shown. Here material is removed from the retainer pin 24a by relieving a part 52 a of the shank portion 26a in the area below the head portion 27a. In other words, a part 52a of the shank portion 26a is formed with a smaller cross section than the remainder 53a of the shank portion 26a so that the mass of the second section 51a is greater than the mass of the first section 50a whereby the center of gravity 44a of the retainer pin 24a is spaced away from the geometric center 46a of the shank portion 26a in a direction from the head portion 27a. It is to be understood that the shank portion 26a can be relieved in other ways, such as, for example, by forming flats on the shank portion 26a in the area beneath the head portion 27a.

In FIGS. 7 and 8 still another form of a retainer pin 24b is shown. The geometric center 46b of the shank portion 26b divides the retainer pin 24b into a first section 50b including the head portion 27b and a part 52b of the shank portion 26b and a second section 51b including the remainder 53b of the shank portion 26b. That part 53b of the shank portion 26b included in the second section 51b has an opening 60 formed therein and an insert member 62 is secured within the opening 60. In the illustrated embodiment, the opening 60 is an axial bore extending into the other end 65 of the shank portion 26b. To unbalance the pin 24b, the insert member 62 is made of a material having a greater density than the material from which the remainder of the retainer pin 24 is made, whereby the mass of the second section is greater than the mass of the first section and the center of gravity 44b, of the retainer pin 24b with the insert member 62 secured therein, is spaced away from the geometric center 46b of the shank portion 26b in a direction away from the head portion 27b.

It will thus be seen, by reference to the foregoing specification and to the appended claims, that the present invention provides a novel socket retention assembly having a number of advantages and characteristics, including those pointed out herein, and others which are inherent in the invention.

I claim:

1. A socket retention assembly comprising a spindle member of a power tool, a socket member releasably and coaxially connected to said spindle member, one of said members having an axial opening therein, the other of said members having a shaft portion which is received in said axial opening, said one of said members having a pair of first transversely extending bores coaxial with each other and each of which opens into said axial opening, said shaft portion having a second transversely extending bore adapted to be aligned with said first transversely extending bores, a retainer pin having a shank portion received in said bores to hold said members in driving engagement with one another, said retainer pin having a head portion at one end of said shank portion and adapted to engage said one of said members in the area adjacent one end of one of said first bores thereby to limit insertion of said pin into said bores, and said retainer pin having its mass between said head and the other end of said shank portion distributed such that the center of gravity of said retainer pin is offset from the axis of rotation of said members in a direction away from said head portion when the retainer pin is positioned in said bores.

2. In a socket retention assembly for releasably connecting a socket member to a spindle member of a power tool wherein one of said members has an axial opening therein, the other of said members has a shaft portion which is received in said axial opening, said one of said members has a pair of first transversely extending bores coaxial with each other and each of which opens into said axial opening, and said shaft portion has a second transversely extending bore adapted to be aligned with said first transversely extending bores, the improvement comprising, a retainer pin having a shank portion received in said bores to hold said members in driving engagement with one another, said retainer pin having a head portion at one end of said shank portion and adapted to engage said one of said members in the area adjacent one end of one of said first bores thereby to limit insertion of said pin into said bores, and said retainer pin having its mass between said head and the other end of said shank portion distributed such that the center of gravity of said retainer pin is offset from the axis of rotation of said members in a direction away from said head portion when the retainer pin is positioned in said bores.

3. A socket retention assembly according to claim 1 or 2 wherein said shank portion has a geometric center approximately midway between the ends of said shank portion dividing said retainer pin into a first section including said head portion and part of the shank portion and a second section including the remainder of said shank portion, and said first section is formed with less material than said second section whereby the mass of said second section is greater than the mass of said first section so that said center of gravity of said retainer pin is spaced away from said geometric center of said shank portion in a direction away from said head portion.

4. A socket retention assembly according to claim 1 or 2 wherein said shank portion has a geometric center approximately midway between the ends of said shank portion dividing said retainer pin into a first section including said head portion and part of said shank portion and a second section including the remainder of said shank portion, and at least a part of the material of said second section is of a greater density than the material of said first section whereby said center of gravity of said retainer pin is spaced away from the geometric center of said shank portion in a direction away from said head portion.

5. A socket retention assembly according to claim 1 or 2 further defined by, said one of said members having an annular groove on the outer periphery thereof, the outer ends of said first bores opening into said annular groove, and a resilient O-ring fitted around the periphery of said one of said members and received in said annular groove.

6. A socket retention assembly according to claim 1 or 2 wherein said shank portion has a geometric center approximately midway between the ends of said shank portion dividing said retainer pin into a first section including said head portion and part of said shank portion and a second section including the remainder of said shank portion, said first section having an axial bore extending through said head portion and into at least a portion of said part of said shank portion, whereby the mass of said second section is greater than the mass of said first section so that said center of gravity of said retainer pin is spaced away from said geometric center of said shank portion in a direction away from said head portion.

7. A socket retention assembly according to claim 1 or 2 wherein said shank portion has a geometric center approximately midway between the ends of said shank portion dividing said retainer pin into a first section including said head portion and part of said shank portion and a second including the remainder of said shank portion, and a portion of the periphery of said shank portion included in said first section having a smaller cross section than the remainder of said shank portion whereby the mass of said second section is greater than the mass of said first section so that said center of gravity of said retainer pin is spaced away from said geometric center of said shank portion in a direction away from said head portion.

8. A socket retention assembly according to claim 1 or 2 wherein said shank portion has a geometric center approximately midway between the ends of said shank portion dividing said retainer pin into a first section including said head portion and a part of said shank portion and a second second section including the remainder of said shank portion, said second section having an opening therein, and an insert member being secured in said opening, said insert member being of a material having a greater density than the material forming said retainer pin whereby said center of gravity, of said retainer pin with said insert member therein, is spaced away from the geometric center of said shank portion in a direction away from said head portion.